No. 645,169. Patented Mar. 13, 1900.
J. J. FAULKNER.
DELINTING MACHINE.
(Application filed Apr. 14, 1899.)
(No Model.) 3 Sheets—Sheet 1.
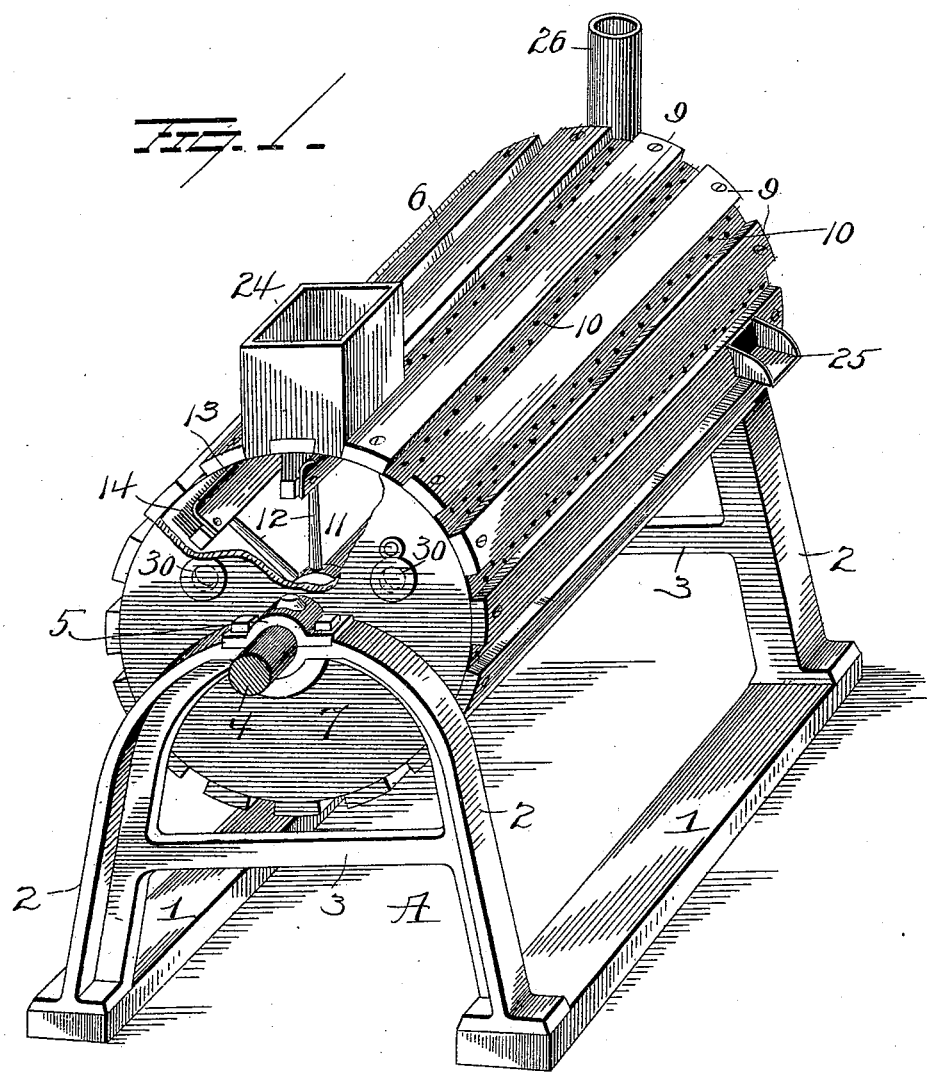
WITNESSES
E. J. Nottingham.
G. F. Downing.
INVENTOR
J. J. Faulkner
By H. A. Seymour
Attorney No. 645,169. Patented Mar. 13, 1900.
J. J. FAULKNER.
DELINTING MACHINE.
(Application filed Apr. 14, 1899.)
(No Model.) 3 Sheets—Sheet 2.
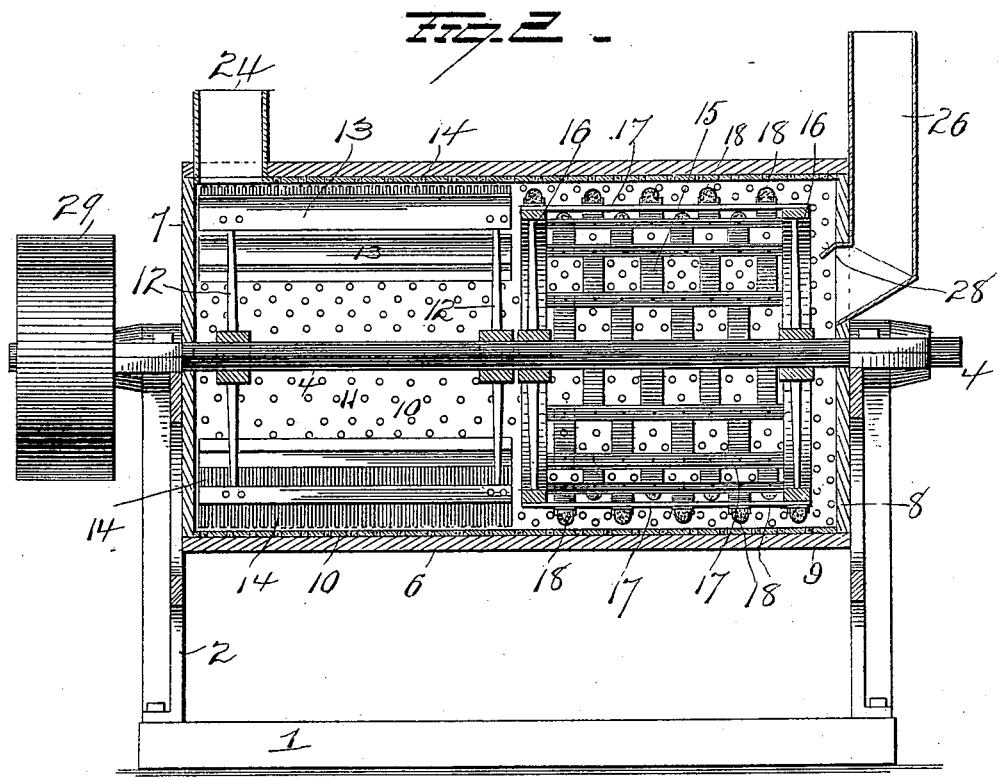
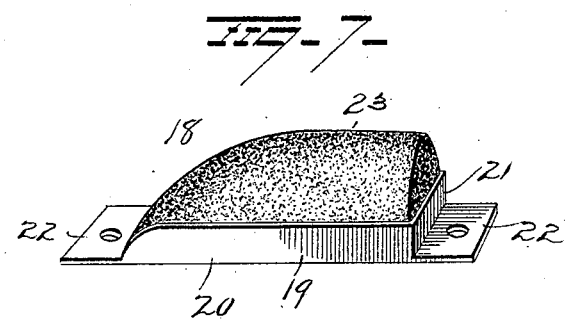
WITNESSES
E. J. Nottingham
G. F. Downing
INVENTOR
J. J. Faulkner
By H. A. Seymour
Attorney

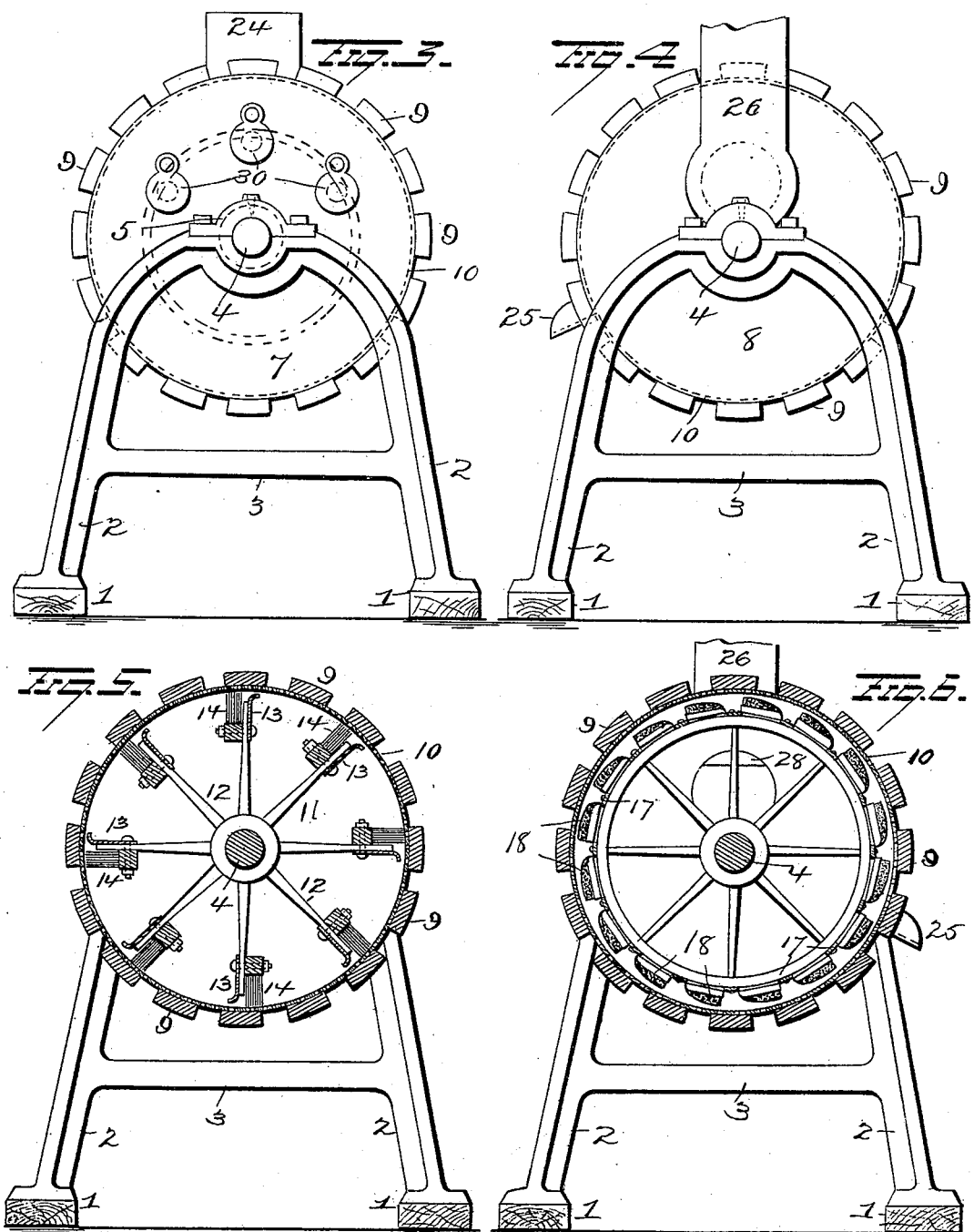

UNITED STATES PATENT OFFICE.

JAMES J. FAULKNER, OF MEMPHIS, TENNESSEE, ASSIGNOR OF ONE-THIRD TO W. S. BRIAN, OF SAME PLACE.

DELINTING-MACHINE.

SPECIFICATION forming part of Letters Patent No. 645,169, dated March 13, 1900.

Application filed April 14, 1899. Serial No. 713,005. (No model.)

*To all whom it may concern:*

Be it known that I, JAMES J. FAULKNER, a resident of Memphis, in the county of Shelby and State of Tennessee, have invented certain new and useful Improvements in Delinting-Machines; and I do hereby declare the following to be a full, clear, and exact description of the invention, such as will enable others skilled in the art to which it appertains to make and use the same.

My invention relates to an improvement in delinting-machines, one object of the invention being to provide an improved machine which can be operated to effectually separate cotton-seed and the lint adhering thereto and recover both the seed and lint.

A further object is to provide a device of the above character which will be extremely simple in construction, comparatively cheap to manufacture, automatic in its action, and most effectual when in use.

With these objects in view the invention consists in certain novel features of construction and combinations and arrangements of parts, as will be more fully hereinafter described, and pointed out in the claims.

In the accompanying drawings, Figure 1 is a view in perspective, illustrating my improvements. Fig. 2 is a view in longitudinal section. Fig. 3 is a front view. Fig. 4 is a rear view. Fig. 5 is a sectional view through the cylinder 6 and agitator 11. Fig. 6 is a sectional view through the cylinder 6 and rubbing-cylinder 15, and Fig. 7 is a detail view of one of the abrading-blocks.

A represents a frame comprising the base blocks or timbers 1 1, on which are mounted semicircular uprights 2 2, spaced a suitable distance apart and each semicircular upright provided with a brace 3, as shown, for strengthening the same. Each upright is provided with a recess at its upper portion for the reception of a shaft 4, and suitable bearing-blocks 5 are secured to said uprights above said recesses to hold the shaft revolubly in place. A cylindrical horizontally-disposed receptacle 6 is secured to the uprights 2 and around the shaft 4 and is closed at its ends, as shown. The cylindrical receptacle 6 is composed of the circular end pieces 7 and 8 and connecting slats or timbers 9. A perforated abrading-cylinder 10 is secured to the inner face of the slats or timbers 9 and is provided with a coating of emery or other suitable abrading material under the slats. It will be seen that as the slats are spaced a short distance apart the perforated cylinder 10 will permit the escape of dust and defective seeds, although the perforations in said cylinder are not of sufficient size to permit the escape of any perfect seed or lint. The perforations in the cylinder will also permit of the entrance of air to overcome the centrifugal action of the seed and lint.

An agitator 11 is provided on the forward half of the shaft 4 in the cylinder and comprises the spiders 12 12, secured to the shaft 4 and connected by metal strips 13 and brushes 14. The strips 13 are curved at their outer edges, and the brushes 14 are secured to the spiders in rear of the strips, as shown. The curved rubbing-strips being placed in comparatively close proximity to the abrading-cylinder admit of the desired quantity of seed coming in contact with the brush at any given time, and they serve also to hold the stock in reserve, being curved to prevent discharging of the seed, as they otherwise would be discharged by centrifugal force, and, further, the curvature of the strips causes the stock of seed so held in check to revolve, and thus be continually brought in contact with the abrading-surface, and, again, while said stock held in check revolves the detached lint will be caused to precipitate from the bulk and to be forced to the center of the machine by air.

My improved rubbing-cylinder 15 is secured on the rear half of the shaft 4 in the receptacle and comprises two or more wheels 16, secured to the shaft, spaced apart and connected together by means of rods or slats 17, secured at their respective ends to the peripheries of said wheels. Abrading-blocks 18 are secured on the rods or slats 17 and are spaced a short distance apart, each series of abrading-blocks being arranged on the rods or slats out of alinement with the next series to permit the seed and lint to fall between the said blocks to the bottom of the receptacle to be again taken up and rubbed. The blocks 18 comprise, preferably, a casing 19, having the sides 20 and end piece 21, and protruding ends 22 for securing the same on the slats, and the casing 19 is filled with emery or other approved abrading material 23, as clearly shown in Fig. 7.

The receptacle 6 is provided with an inlet-spout 24 at its upper forward end and an outlet-spout 25 near its lower rear end for the seed. A suction-tube 26 communicates with the upper portion of the rear end of the receptacle for carrying off the lint, and a suitable deflector 28 is provided over the outlet to said tube to direct the seeds away from the suction-tube and prevent the accidental escape of the seed into the same. A pulley 29 is secured on the forward protruding end of the shaft 4 and is adapted to be turned by any approved means. (Not shown.) The front end of the receptacle is provided with suitable draft-regulators 30 to increase or diminish the force of draft through the receptacle.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a delinting-machine, the combination with an abrading-cylinder and a supporting-frame therefor, of a shaft revolubly mounted in said cylinder and an agitator on said shaft comprising a series of curved rubbing-strips and brushes adjacent to and in rear of said strips.

2. In a delinting-machine, the combination with an abrading-cylinder and a supporting-frame therefor, of a shaft revolubly mounted in said cylinder, a rubbing-cylinder in said abrading-cylinder and secured to said shaft, said rubbing-cylinder comprising wheels, a series of slats connecting said wheels and a series of abrading-blocks secured on each pair of slats the abrading-blocks of each series alternating with those of the adjacent series.

3. In a delinting-machine, the combination with an abrading-cylinder and a supporting-frame therefor, of a shaft revolubly mounted in the abrading-cylinder, an agitator on the shaft having curved strips and brushes thereon coöperating with the abrading-cylinder as described and a rubber also secured on said shaft.

4. In a delinting-machine, the combination with an abrading-cylinder and a supporting-frame therefor, of a shaft revolubly mounted in said cylinder, an agitator and a rubbing-cylinder secured to said shaft, a suction-pipe communicating with one end of said cylinder for carrying off lint and draft-regulators at the other end of the cylinder to regulate the passage of air through the cylinder.

5. An abrading-block for a delinting-machine comprising a detachable three-sided receptacle, a filling of abrading material in said receptacle and projections on the receptacle for conveniently securing the receptacle to the abrading-machine.

6. A delinting-machine, comprising a stationary abrading-cylinder, perforated throughout its entire circumference, a shaft extending through said cylinder, a series of brushes secured to said shaft within one part of the cylinder and a series of rubbers of abrading material secured to the shaft in another part of the cylinder and longitudinal slats spaced apart on the perforated cylinder.

7. In a delinting-machine, the combination with a stationary cylinder provided interiorly with abrading material and exteriorly with slats spaced apart, of a revoluble shaft in the cylinder, an annular series of brushes secured to said shaft and a curved rubbing-plate secured to each brush.

In testimony whereof I have signed this specification in the presence of two subscribing witnesses.

JAMES J. FAULKNER.

Witnesses:
HUGH B. CULLEN,
J. E. WADDELL.